United States Patent [19]

Meiller et al.

[11] Patent Number: 5,776,228

[45] Date of Patent: Jul. 7, 1998

[54] VAPOR STORAGE CANISTER WITH FOAM SCREEN RETAINER

[75] Inventors: Thomas Charles Meiller, Pittsford; Timothy Michael Beadnell, Avon; Charles Henry Covert, Manchester; Robert Augustine Zaso; Gordon Richard Paddock, both of Rochester, all of N.Y.

[73] Assignee: General Motors Corporation, Detroit, Mich.

[21] Appl. No.: 818,019

[22] Filed: Mar. 14, 1997

[51] Int. Cl.⁶ ............................................. B01D 53/04
[52] U.S. Cl. ................................. 96/134; 96/139; 96/141; 96/144; 96/152; 123/519
[58] Field of Search ..................... 55/134, 135, 137, 55/139, 140, 141, 142, 143, 144, 147, 149, 152, 385.3; 95/146; 123/519

[56] References Cited

U.S. PATENT DOCUMENTS

| | | |
|---|---|---|
| 4,306,894 | 12/1981 | Fukami et al. ............... 96/131 |
| 4,308,840 | 1/1982 | Hiramatsu et al. ........... 123/519 |
| 4,331,120 | 5/1982 | Hiramatu et al. ............ 123/519 |
| 4,338,106 | 7/1982 | Mizuno et al. ............... 96/139 |
| 4,381,929 | 5/1983 | Mizuno et al. ............... 96/130 |
| 4,386,947 | 6/1983 | Mizuno et al. ............... 96/137 |
| 4,403,587 | 9/1983 | Mizuno et al. ............... 123/159 |
| 4,430,099 | 2/1984 | Yanagisawa et al. ......... 96/139 |
| 4,446,838 | 5/1984 | Suzuki et al. ................ 123/520 |
| 4,454,849 | 6/1984 | Mizuno et al. ............... 123/519 |
| 4,496,379 | 1/1985 | Kozawa ....................... 96/130 |
| 4,507,132 | 3/1985 | Yoshida ....................... 55/320 |
| 4,598,686 | 7/1986 | Lupoli et al. ................ 123/519 |
| 4,750,465 | 6/1988 | Rediker, Jr. et al. ......... 123/519 |
| 4,758,255 | 7/1988 | Yamada et al. ............... 96/137 |
| 4,766,872 | 8/1988 | Kato et al. ................... 123/519 |
| 4,778,495 | 10/1988 | Bishop et al. ................ 55/269 |
| 4,853,009 | 8/1989 | Turner et al. ................ 123/519 |
| 4,877,001 | 10/1989 | Kenealy et al. .............. 123/520 |
| 4,951,643 | 8/1990 | Sato et al. .................... 123/520 |
| 4,962,744 | 10/1990 | Uranishi et al. ............. 123/520 |
| 5,098,453 | 3/1992 | Turner et al. ................ 96/149 |
| 5,170,765 | 12/1992 | Hoshino et al. .............. 123/520 |
| 5,173,095 | 12/1992 | Yasukawa et al. ........... 96/122 |
| 5,304,235 | 4/1994 | Watanabe et al. ............ 96/144 |
| 5,355,861 | 10/1994 | Arai ............................. 123/519 |
| 5,361,743 | 11/1994 | Denz et al. ................... 123/519 |
| 5,373,830 | 12/1994 | Denz et al. ................... 123/520 |
| 5,453,118 | 9/1995 | Heiligman .................... 96/147 |
| 5,456,236 | 10/1995 | Wakashiro et al. ........... 123/519 |
| 5,460,136 | 10/1995 | Yamazaki et al. ............ 123/519 |
| 5,632,808 | 5/1997 | Hara et al. .................... 123/519 |
| 5,641,344 | 6/1997 | Takahashi et al. ............ 96/141 |

FOREIGN PATENT DOCUMENTS

| | | | |
|---|---|---|---|
| 556488 | 8/1993 | European Pat. Off. ....... 123/519 |
| 3828602 | 3/1990 | Germany ..................... 96/144 |
| 55-99318 | 7/1980 | Japan ........................... 96/144 |
| 58-200070 | 11/1983 | Japan ........................... 123/519 |
| 1-134059 | 5/1989 | Japan ........................... 123/519 |

Primary Examiner—Duane S. Smith
Attorney, Agent, or Firm—Saul Schwartz

[57] ABSTRACT

A fuel vapor storage canister having a screen module between carbon granules in the canister and a purge port of the canister. The screen module includes a module body defining a plenum, a flat plastic foam screen seated on an uninterrupted edge of a raised boss on the module body around the plenum, and a retainer clamped to the module body over the flat foam screen. A tubular stem on the module body plugs into a socket in the storage canister. An interference fit between the tubular stem and the socket prevents migration of carbon granules between the socket and the tubular stem. The foam screen is exposed to the carbon bed chamber through a window in a planar side of the retainer which planar side, in a seated position of the retainer on the module body, cooperates with the uninterrupted edge of the raised boss in compressing a segment of the foam screen to define a seal around the window. Hooks on the module body cooperate with resilient loops on the retainer in maintaining the integrity of the seal around the foam screen by preventing release of the retainer from its seated position on the module body.

4 Claims, 3 Drawing Sheets

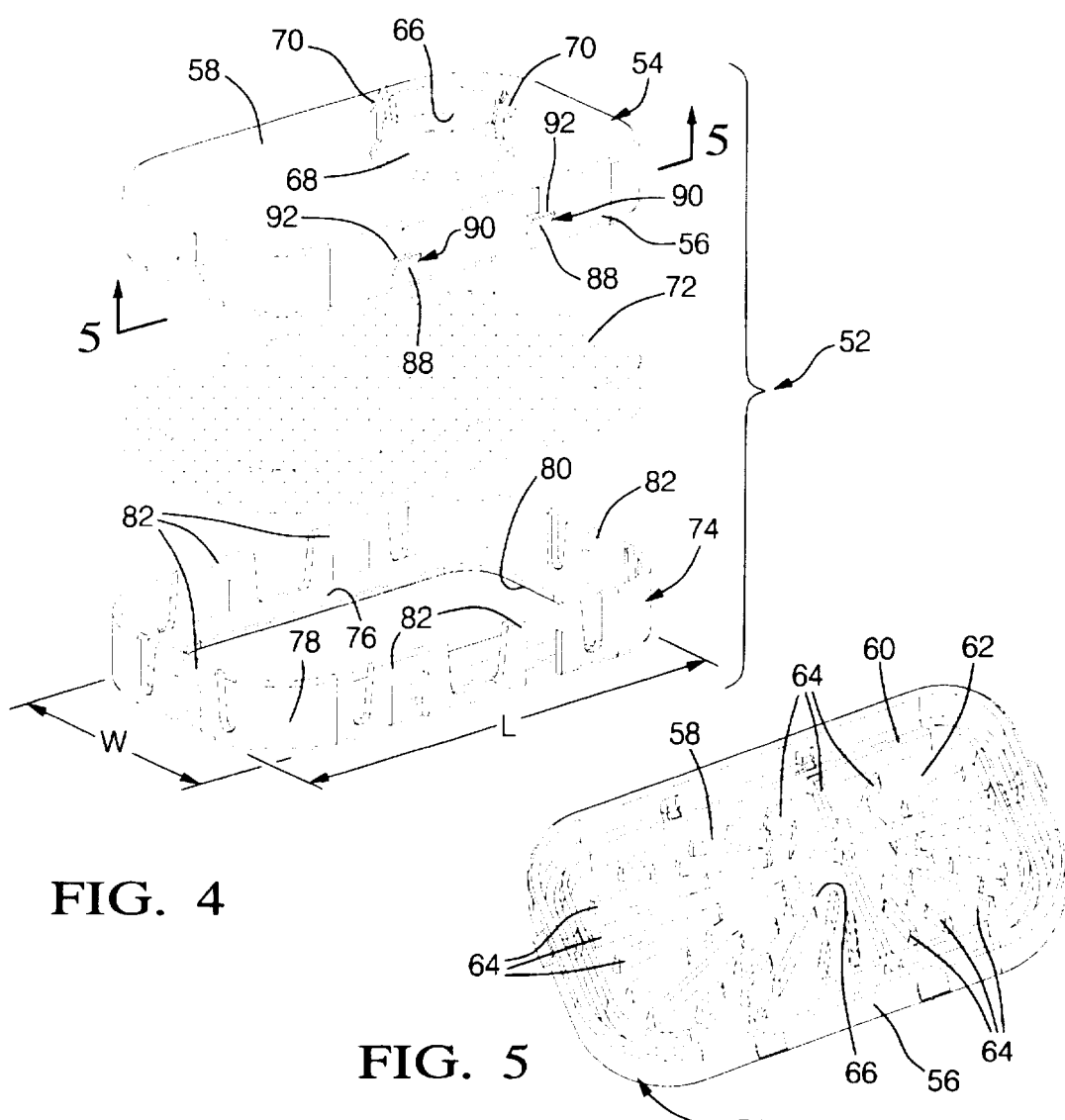
FIG. 4
FIG. 5
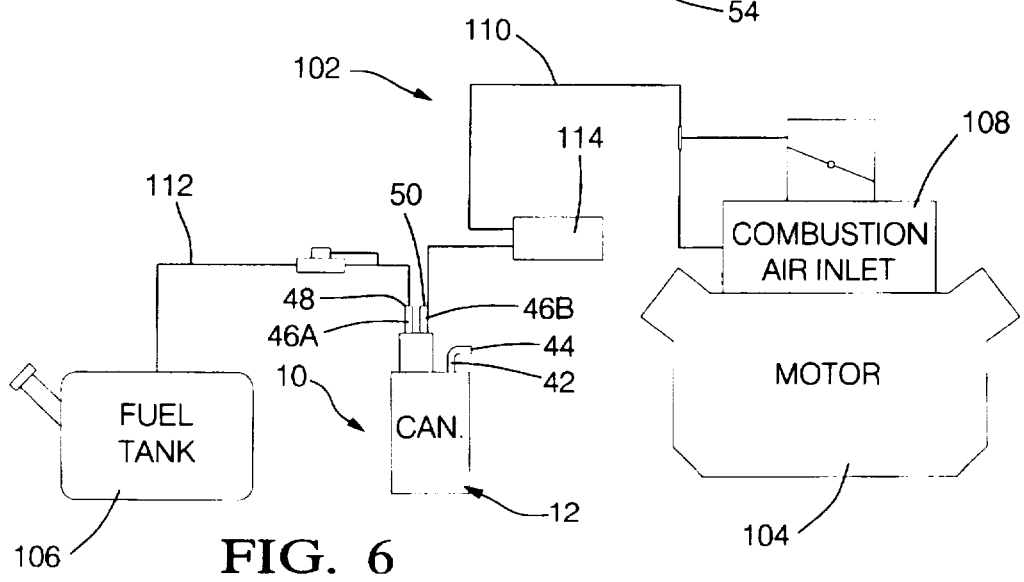
FIG. 6

VAPOR STORAGE CANISTER WITH FOAM SCREEN RETAINER

TECHNICAL FIELD

This invention relates to fuel vapor storage canisters in motor vehicle evaporative emission control systems.

BACKGROUND OF THE INVENTION

Typical motor vehicle evaporative emission control systems include a fuel vapor storage canister, a mass of carbon granules in the storage canister, a vapor transfer duct between a vapor inlet port of the storage canister and a fuel tank of the motor vehicle, a canister purge duct between a motor of the vehicle and a purge port of the storage canister, and a solenoid valve in the canister purge duct. When the motor is on, the solenoid valve opens the canister purge duct to induce a flow of air through the mass of carbon granules in the canister to strip fuel vapor therefrom. It is known to equip such prior fuel vapor storage canisters with a plastic foam screen between the mass of carbon granules and the purge port to minimize contamination of the solenoid valve in the canister purge duct by entrained carbon granules. Such foam screens are effective but may permit downstream migration of carbon granules in the circumstance that vibration of the storage canister shakes loose the plastic foam screen.

SUMMARY OF THE INVENTION

This invention is a new and improved fuel vapor storage canister having a screen module between a mass of carbon granules in a carbon bed chamber of the storage canister and a purge port of the storage canister. The screen module includes a module body defining a plenum, a flat plastic foam screen seated on an uninterrupted edge of a raised boss on the module body around the plenum, and a retainer clamped to the module body over the flat foam screen. A tubular stem on the module body plugs into a socket in the storage canister exposed to the purge port so that the flat plastic foam screen is disposed between the carbon bed chamber and the purge port. An interference fit between the tubular stem and the socket prevents migration of carbon granules through the socket around the tubular stem. The foam screen is exposed to the carbon bed chamber through a window in a planar side of the retainer which planar side, in a seated position of the retainer on the module body, cooperates with an uninterrupted edge of the raised boss in compressing a segment of the foam screen to define an uninterrupted seal around the window which prevents migration of carbon granules around the flat foam screen. Hooks on the module body cooperate with resilient loops on the retainer in maintaining the integrity of the seal around the foam screen by preventing release of the retainer from its seated position on the module body.

BRIEF DESCRIPTION OF THE DRAWINGS

FIG. 4 is a fragmentary, exploded perspective view of a modular screen assembly of the fuel vapor storage canister according to this invention;

FIG. 5 is a view taken generally along the plane indicated by lines 5—5 in FIG. 4; and FIG. 6 is a fragmentary, schematic representation of a motor vehicle evaporative emission control system including the fuel vapor storage canister according to this invention.

DESCRIPTION OF THE PREFERRED EMBODIMENT

Figure 1:
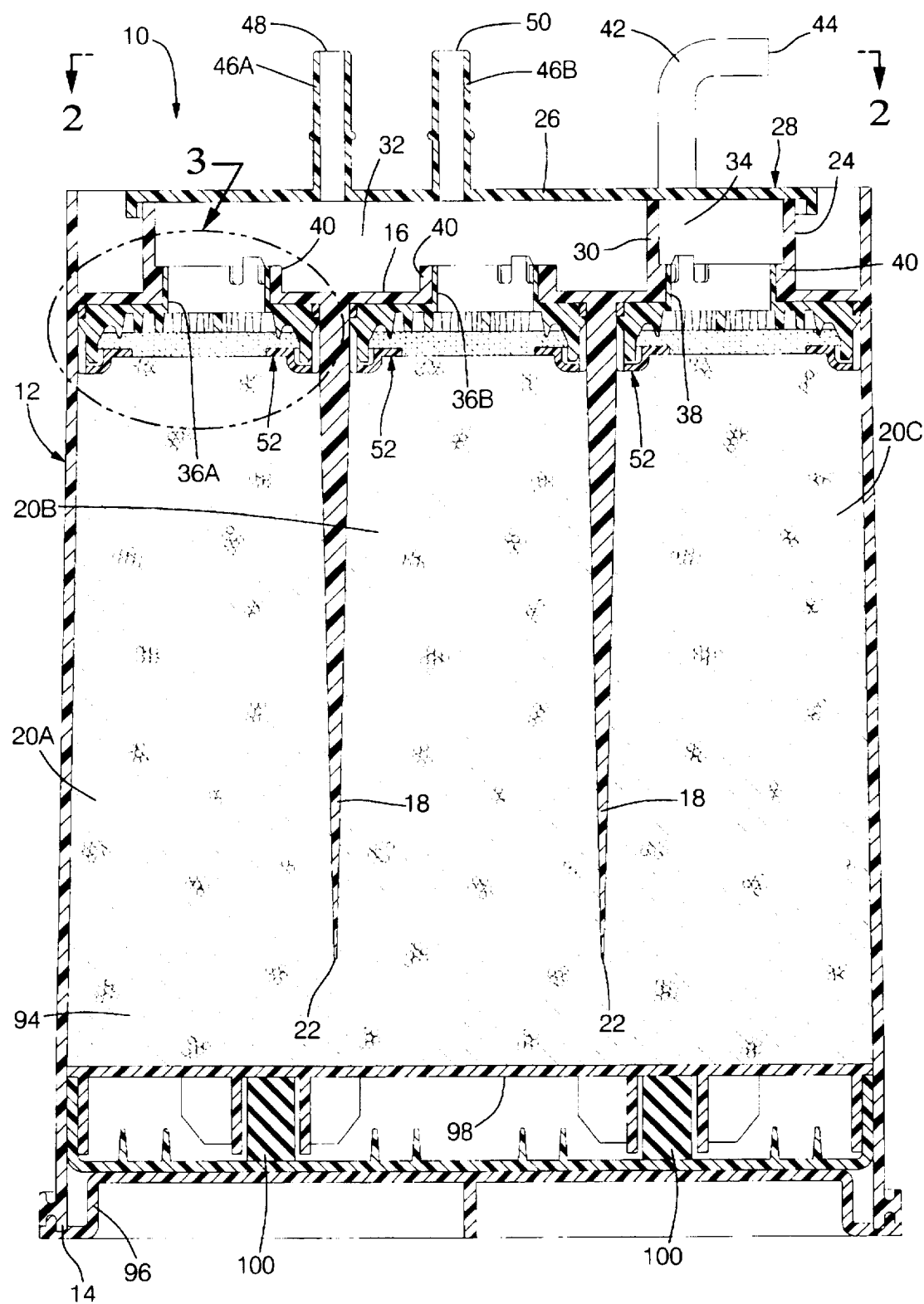
FIG. 1 is a sectional view in elevation of a fuel vapor storage canister according to this invention.
Figure 2:
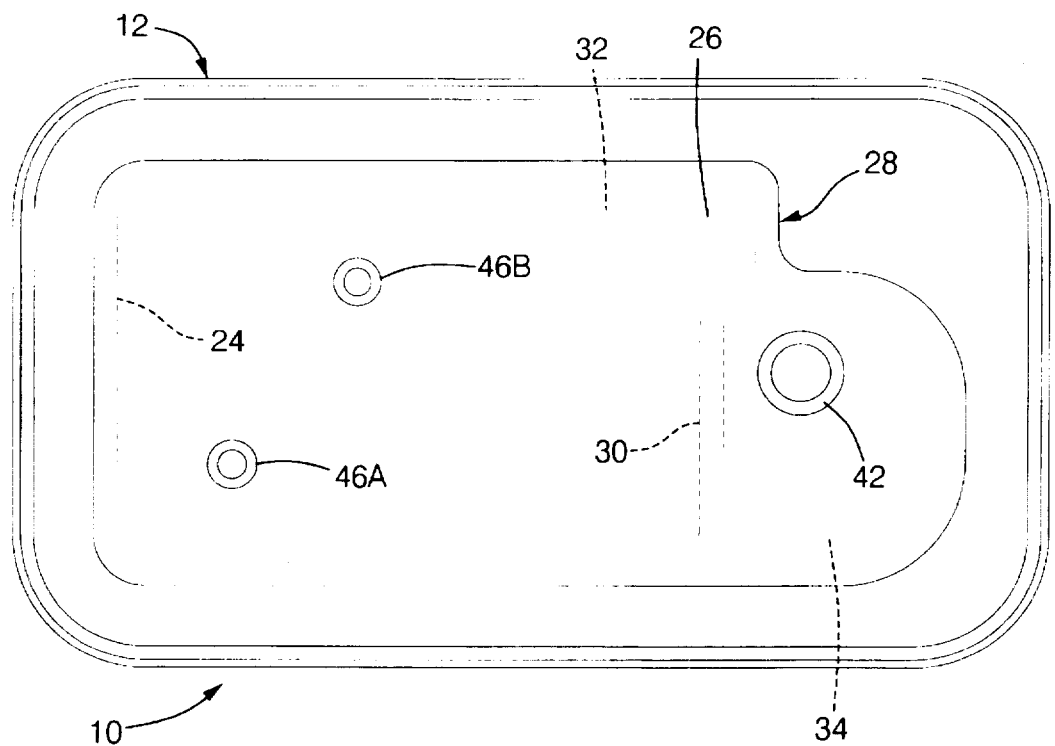
FIG. 2 is a view taken generally along the plane indicated by lines 2—2 in FIG. 1.

Referring to FIGS. 1–5, a fuel vapor storage canister 10 according to this invention includes a cup-shaped, molded plastic canister body 12 having an open end 14 and a closed end 16. A plurality of integral partitions 18 cooperate with the closed end 16 in dividing the canister body into a plurality of carbon bed chambers 20A, 20B, 20C. Each partition 18 terminates at an edge 22 inboard of the open end 14 of the canister body.

A wall 24 on the closed end 16 of the canister body on the opposite side thereof from the carbon bed chambers 20A–C cooperates with a cover 26 and with the closed end 16 in defining a liquid trap 28 on the canister body. The liquid trap is divided by a partition 30 into a first chamber 32 and a second chamber 34 separate from the first chamber. A pair of circular sockets 36A, 36B in the closed end 16 afford communication between the first chamber 32 of the liquid trap and corresponding ones of the carbon bed chambers 20A, 20B. A third circular socket 38 in the closed end 16 affords communication between the second chamber 34 of the liquid trap and the carbon bed chamber 20C. Each of the circular sockets 36A–B, 38 is surrounded by a raised lip 40 in the liquid trap 28 integral with the closed end 16.

A tubular boss 42 on the cover 26 in flow communication with the second chamber 34 of the liquid trap defines a vent port 44 of the vapor storage canister 10. A pair of tubular bosses 46A, 46B on the cover 26 each in flow communication with the first chamber 32 of the liquid trap define a vapor inlet port 48 and a vapor purge port 50, respectively, of the vapor storage canister. A plurality of screen modules 52 are interposed between the carbon bed chambers 20A, 20B and the first chamber 32 of the liquid trap and between the carbon bed chamber 20C and the second chamber 34 of the liquid trap.

As seen best in FIGS. 2–5, each screen module 52 includes a molded plastic module body 54 having a side wall 56, a flat bottom 58, and an uninterrupted raised boss 60 on the flat bottom surrounding a plenum 62 on the module body. A plurality of linear bosses 64 on the flat bottom 58 in the plenum 62 have the same height as the raised boss 60 and radiate from and traverse an aperture 66 in the flat bottom.

Each module body 54 has an integral tubular stem 68 thereon around the aperture 66, the diameter of which is calculated to achieve an interference fit with circular sockets 36A, 36B, 36C. The module bodies are attached to the canister body 12 by plugging the tubular stems 68 into respective ones of the circular sockets 36A, 36B, 36C to a depth limited by engagement of the flat bottoms of the module bodies on the closed end 16 of the canister body. Each tubular stem 68 has a pair of laterally flexible hooks 70 thereon which snap over lands on the tops of the lips 40 surrounding the circular sockets 36A, 36B, 38 for positive retention of the tubular stems in the circular sockets and the module bodies 54 on the canister body 12.

Each screen module 52 further includes a flat foam screen 72 seated on and overlapping the rectangular raised boss 60 around the corresponding plenum 62 and over the linear bosses 64 within the rectangular boss. Pores, not shown, in the plastic foam screen 72 capture particles entrained in a gaseous flow through the screen.

A retainer 74 of each of the screen modules 52 has a rectangular planar side 76 and an integral side wall 78 perpendicular to the planar side. A length dimension "L" and a width dimension "W" of the side wall 78 of the retainer slightly exceed corresponding length and width dimensions of the side wall 56 of the corresponding module body 54. An inner edge 80 of the planar side 76 defines a rectangular window of the retainer. The side wall 78 of the retainer has a plurality of integral loops 82 therein resiliently flexible laterally relative to the adjacent portions of the side wall.

Figure 3:
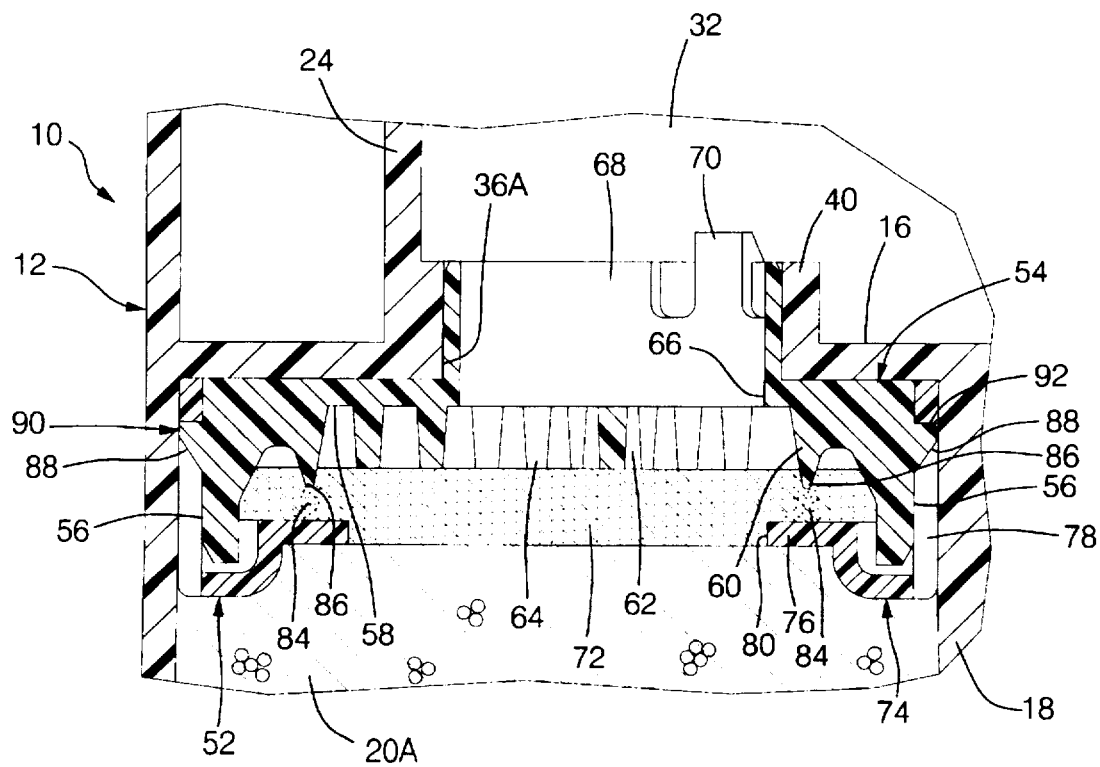
FIG. 3 is an enlarged view of the portion of FIG. 1 in the reference circle 3.

The retainer 74 is pushed over the side wall 56 of the corresponding module body 54 to a seated position, FIGS. 1 and 3, in which a segment 84 of the plastic foam screen 72 between the planar side 76 of the retainer and an uninterrupted edge 86 of the raised boss 60 is tightly compressed between the planar side and the uninterrupted edge. As the retainer is pushed over the side wall 56 of the module body, each of the loops 82 on the retainer is resiliently flexed laterally outward over a ramp 88 on a corresponding one of a plurality of hooks 90 on the side wall 56 of the module body. Concurrent with retainer 74 achieving its seated position on the module body 54, each of the loops 82 snaps over a flat end 92 of the corresponding one of the hooks 90 for positively preventing dislodgment of the retainer from its seated position.

After the screen modules 52 are mounted on the canister body by plugging the tubular stems 68 into respective ones of the circular sockets 36A, 36B, 38, the canister body 12 is filled through its open end 14 with a mass 94 of carbon granules to above the edges 22 of the partitions 18. A cover 96 seals closed the open end of the canister body. A plate 98 between the cover 96 and the mass 94 of carbon granules is biased against the latter by a pair of elastomeric springs 100 for compacting the carbon granules in the carbon bed chambers 20A–C.

Referring to FIG. 5, the vapor storage canister 10 is incorporated in a schematically and fragmentarily illustrated evaporative emission control system 102 of a motor vehicle between a motor 104 of the vehicle and a fuel tank 106 of the vehicle. A combustion air inlet 108 of the motor 104 is connected to the purge port 50 of the storage canister 10 through a vapor purge duct 110. The fuel tank 106 of the motor vehicle is connected to the vapor inlet port 48 of the storage canister 10 through a vapor transfer duct 112. A solenoid valve 114 in the purge duct 110 opens and closes the purge duct when the motor 104 is on and off, respectively.

Vapor pressure in the fuel tank 106 induces a flow of a mixture of fuel vapor and air to the carbon bed chambers 20A, 20B through the vapor transfer duct 112, the vapor inlet port 48, the first chamber 32 of the liquid trap, and the portion of the plastic foam screens 72 exposed to the carbon bed chambers 20A, 20B through the aforesaid windows in the retainers 74. The raised lips 40 around the circular sockets 36A, 36B and other baffles, not shown, in the liquid trap cooperate to prevent liquid fuel in the vapor transfer duct 112 from entering the carbon bed chambers 20A, 20B.

Inside the canister body, the fuel vapor and air mixture circulates through the mass 94 of carbon granules in the carbon bed chambers 20A–C toward the vent port 44 during which circulation the carbon granules strip the vapor from the mixture so that uncontaminated air flows through the flat foam screen 72 between the carbon bed chamber 20C and the vent port 44 and is expelled through the vent port 44. The solenoid valve 114 closes the purge duct 110 when the motor 104 is off to prevent escape of fuel vapor from the canister body through the purge duct.

When the motor is on, the combustion air inlet 108 of the motor is at subatmospheric pressure and the solenoid valve 114 opens the purge duct 110. The pressure gradient between the combustion air inlet 108 and the vent port 44 of the storage canister 10 induces a flow of fresh air through the carbon bed chambers 20A–C from the vent port 44 toward the purge port 50. The fresh air strips fuel vapor from the mass 94 of carbon granules in the canister body to produce a gaseous mixture of air and fuel vapor which flows to the combustion air inlet 108 through the portions of the plastic foam screens 72 exposed to the carbon bed chambers 20A, 20B through the aforesaid windows in the retainers 74, the plenums 62, the first chamber 32 of the liquid trap 28, the vapor purge port 50, and the purge duct 110.

The plastic foam screens 72 trap carbon granules entrained in such gaseous mixture to prevent contamination of the solenoid valve 114 in the purge duct 110 downstream of the purge port 50. The compressed segments 84 of the plastic foam screens around the windows in the retainers 74 prevent migration of carbon granules around the foam screens from the carbon bed chambers 20A, 20B to the plenums 62 and to the purge port 50. Importantly, the loops 82 on the retainers 74, self-biased over the hooks 90 on the module bodies 54, maintain the integrity of the seals at the compressed segments 84 of the plastic foam screens by preventing displacement of the retainers from their seated positions. Accordingly, even in the circumstance that the vapor storage canister 10 experiences substantial vibration and significant temperature excursions, the screen modules 52 prevent migration of carbon particles from the carbon bed chambers 20A, 20B to the plenums 62 around the plastic foam screen.

We claim:

1. A fuel vapor storage canister for a motor vehicle evaporative emission control system including a cup-shaped canister body having a vent port through which said canister body communicates with the atmosphere surrounding said fuel vapor storage canister and a purge port through which said canister body communicates with a region of subatmospheric pressure to induce a flow of air through said canister body from said vent port to said purge port, a mass of carbon granules in said canister body, and a screen module between said purge port and said mass of carbon granules in said canister body, characterized in that said screen module comprises:

a module body having a bottom wall, a raised boss on said bottom wall of said module body having an uninterrupted edge around a plenum on said module body, an aperture in said bottom wall in fluid communication with said plenum, a flat foam screen over said plenum seated on said uninterrupted edge of said raised boss, a retainer over said flat foam screen having a seated position on said module body in which a segment of said flat foam screen is compressed between a planar side of said retainer having a window therein and said uninterrupted edge of said raised boss thereby to define a seal around said window preventing migration of carbon granules to said plenum around said flat foam screen, a retention means on said retainer and on said module body operative to maintain the integrity of said seal at said compressed segment of said flat foam screen by preventing dislodgment of said retainer from said seated position thereof on said module body, and an attachment means operative to mount said module body on said canister body with said flat foam screen exposed to said mass of carbon granules and with said aperture in said bottom wall of said modular body in fluid communication with said purge port of said canister body.

2. The vapor storage canister recited in claim 1 wherein said retention means on said retainer and on said module body operative to maintain the integrity of said seal at said compressed segment of said flat foam screen comprises:

a plurality of hooks on a first one of said module body and said retainer, and a plurality of laterally flexible loops on a second one of said module body and said retainer each operative to resiliently snap over a corresponding one of said hooks in said seated position of said retainer on said module body.

3. The vapor storage canister recited in claim 2 wherein said attachment means operative to mount said module body on said canister body comprises:

a circular socket in said canister body between said mass of carbon granules and said purge port of said canister body, and a tubular stem on said module body around said aperture therein having a diameter calculated to achieve an interference fit with said circular socket when said tubular stem is pushed into said circular socket to prevent migration of carbon granules between said tubular stem and said circular socket.

4. The vapor storage canister recited in claim 3 further comprising:

a land on said canister body adjacent said circular socket therein, and a laterally flexible hook on said tubular stem hooked over said land on said canister body to prevent dislodgment of said tubular stem from said circular socket.

* * * * *